C. G. STEPHENSON.
SPRING FRAME FOR MOTOR CYCLES.
APPLICATION FILED JULY 3, 1911.
1,029,771.
Patented June 18, 1912.
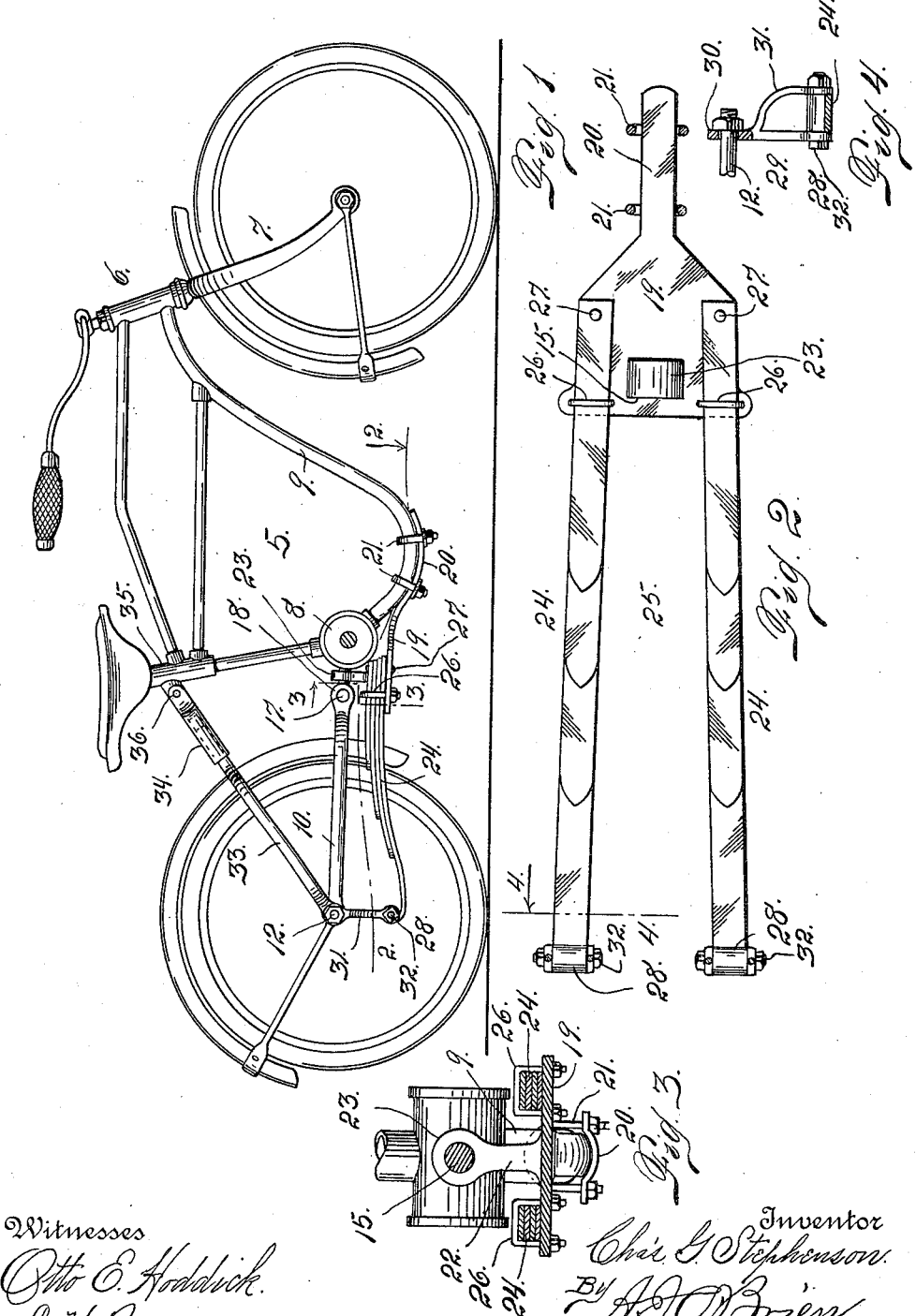

UNITED STATES PATENT OFFICE.

CHARLES G. STEPHENSON, OF DENVER, COLORADO.

SPRING-FRAME FOR MOTOR-CYCLES.

1,029,771. Specification of Letters Patent. Patented June 18, 1912.

Application filed July 3, 1911. Serial No. 636,783.

*To all whom it may concern:*

Be it known that I, CHARLES G. STEPHENSON, a citizen of the United States, residing in the city and county of Denver and State of Colorado, have invented certain new and useful Improvements in Spring-Frames for Motor-Cycles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring frames for motorcycles and other velocipedes, being, however, more especially intended to relieve the vibration incident to the use of motorcycles. It is well known that, under ordinary conditions, the vibration is very annoying to the rider, and, undoubtedly, will result in injury to the health when protracted riding is indulged in.

My object is to overcome this difficulty, as far as possible, and to this end a spring is located below the lower rear fork of the machine, the spring being supported at its rear extremity on links hanging from the opposite extremities of the rear axle, while its forward extremity is connected with a plate carried by the framework of the machine, the said plate being further supported by an eye-lug through which passes a relatively short member connected at one extremity with the crank hanger of the machine, while its other extremity is perforated to receive a pin which connects the rear fork through the medium of the said member with the crank hanger. By virtue of this construction and arrangement, as the spring moves downwardly, the links, with which its rear extremities are connected, swing rearwardly, thus allowing the spring full opportunity to expand during its downward movement, without bringing the rear axle of the machine and the crank hanger closer together, the last-named condition being objectionable since it loosens the sprocket-chain with the result that the latter is liable to fly off.

Having briefly outlined my improved construction, I will proceed to describe the same in detail, reference being made to the accompanying drawing, in which is illustrated an embodiment thereof.

In this drawing: Figure 1 is a side elevation of a motorcycle equipped with my improved construction. Fig. 2 is a section taken on the line 2—2 of Fig. 1, looking downwardly, certain parts located above the plane of the section being indicated by dotted lines, while the vertically-disposed eye-lug, connecting the spring-supporting plate with the lower rear fork, is shown in top plan, the parts all being shown on a larger scale than in Fig. 1. Fig. 3 is a vertical section, taken on the line 3—3 of Fig. 1, looking toward the right. Fig. 4 is a detail view of one of the links with which the rear extremity of the chain is connected, looking in the direction of arrow 4, Fig. 2, the link being shown partially in section, the spring extremity connected therewith also being sectionized.

The same reference characters refer to the same parts in all the views.

Let the numeral 5 designate generally the framework of a motorcycle, the steering head 6 of the front fork 7 being connected with the crank hanger 8 by a rigid bar 9, in the usual manner. The lower rear fork 10 is pivotally connected with the axle 12, as in the ordinary construction of machines of this class, while its forward extremity is bifurcated, as shown at 13, to receive a rearwardly-extending member 15, which is rigidly secured to the crank hanger 8 at its forward end, its rear extremity being perforated to receive a connecting pin 17, which passes through registering openings formed in the member 15, and the adjacent arms 18 of the bifurcated extremity 13 of the fork 10.

Below the forward extremity of the fork 10 and the crank hanger is located a plate 19, whose forward extremity is reduced, as shown at 20, and connected with the lower part of the frame bar 9, by U-bolts 21. This plate is further connected with the member 15 by means of a vertically-disposed member 22 whose upper extremity is provided with an eye 23 through which the member 15 passes, the lower extremity of the part 22 being rigidly connected with the plate. This plate 19 forms the support for the forward extremities of two members 24 of a spring 25, the spring members being connected with the plate by means of U-bolts 26, their forward extremities being further secured to the plate by rivets 27. The rear extremities of these spring members are pivotally connected, as shown at 28, with links 29, whose upper extremities are pivotally connected, as shown at 30, with the rear axle 12 of the machine. These links 29 are reinforced, as shown at 31, whereby their lower portions are bifurcated to receive the rear extremities of the spring members 24, the said extremities being connected with the links by bolts 32. By virtue of this construction and arrangement, the necessary yielding capacity for the frame is obtained without bringing the crank hanger and rear axle sufficiently close together during the downward movement of the spring to materially loosen the chain connecting the sprockets of the crank hanger and the rear axle. In order to make this construction practicable, the upper rear fork 33 has a telescopic connection with a part 34 pivotally connected to the seat post 35, as shown at 36.

Having thus described my invention, what I claim is:

1. A spring frame for motorcycles and other similar machines, comprising in combination with a frame having upper and lower rear forks, the upper rear fork having a telescopic connection with the seat post, a spring whose forward extremity is secured to the framework of the machine and whose rear extremity is suspended by hanger links supported by the rear axle, substantially as described.

2. The combination with the framework of a machine of the class described, of a spring located below the lower rear fork of the machine, its forward extremity being connected with the frame, links depending from the opposite extremities of the rear axle with which they are pivotally connected, the rear extremity of the spring being connected with the said links, substantially as described.

3. The combination with the framework of a motorcycle or similar machine, of a plate secured to the framework of the machine below the crank hanger and to the lower rear fork in the rear of the crank hanger, and a spring whose forward extremity is secured to the said plate, the rear extremity of the spring having a link connection with the rear axle of the machine, substantially as described.

4. The combination with the framework of a machine, of the class described, of a plate secured to the framework and located below the crank hanger, and a spring composed of two separated members, whose forward extremities are connected with the said plate and whose rear extremities have a link connection with the opposite extremities of the rear axle, substantially as described.

In testimony whereof I affix my signature in presence of two witnesses.

CHARLES G. STEPHENSON.

Witnesses:
  JNO. G. POWELL,
  F. E. BOWEN.

---

Copies of this patent may be obtained for five cents each, by addressing the "Commissioner of Patents, Washington, D. C."